United States Patent [19]

Ferretti

[11] Patent Number: 5,279,765
[45] Date of Patent: Jan. 18, 1994

[54] PROCESS FOR PREPARING BAFBR:EU PHOSPHORS

[75] Inventor: August Ferretti, Wilmington, Del.

[73] Assignee: E. I. Du Pont de Nemours and Company, Wilmington, Del.

[21] Appl. No.: 814,266

[22] Filed: Dec. 24, 1991

Related U.S. Application Data

[63] Continuation of Ser. No. 383,333, Jul. 20, 1989, abandoned.

[51] Int. Cl.$^5$ ............................................. C09K 11/61
[52] U.S. Cl. ............................................. 252/301.4 H
[58] Field of Search ................................... 252/391.4

[56] References Cited

U.S. PATENT DOCUMENTS

| | | | |
|---|---|---|---|
| 4,076,897 | 2/1978 | Joiner, Jr. | 428/539 |
| 4,157,981 | 6/1979 | Stevels et al. | 252/301.4 |
| 4,524,016 | 6/1985 | Ferretti | 252/301.4 |
| 4,532,071 | 7/1985 | Nakamura et al. | 252/301.4 |
| 4,535,237 | 8/1985 | Takahashi et al. | 252/301.4 H |

FOREIGN PATENT DOCUMENTS 254836  2/1988  European Pat. Off. ..... 252/301.4 H

OTHER PUBLICATIONS

Stevels et al., Phillips Research Report, vol. 30(5), pp. 277-290 (1975).

Primary Examiner—Jack Cooper
Attorney, Agent, or Firm—Susan Borden Evans

[57] ABSTRACT

A process for producing BaFBr:Eu phosphors in which a slurry of an Eu halide, BaFBr and BaBr$_2$ is spray dried to produce spherical agglomerates which are then fired and cooled by an inert atmosphere, washed to remove unreacted BaBr$_2$ and dried to produce a powder.

7 Claims, No Drawings

PROCESS FOR PREPARING BAFBR:EU PHOSPHORS

This application is a continuation of application Ser. No. 07/383,333, filed on Jul. 20, 1980 now abandoned.

BACKGROUND OF THE INVENTION

1. Technical Field

This invention relates to an improved process for Preparing BaFBr:Eu phosphors for use in x-ray intensifying screens, as well as the phosphors made by the process.

2. Background Art

The development and use of x-ray intensifying screens based on barium halides such as BaFCl:Eu permitted a significant decrease in patient exposure to x-rays because BaFCl:Eu has the ability to absorb a larger fraction of the incident x-rays and convert this absorbed x-ray radiation to a greater amount of visible light than the widely used screens based on calcium tungstate. The speed of BaFCl:Eu based screen systems is generally at least twice the speed of calcium tungstate based screen systems.

BaFBr:Eu has similar chemistry to BaFCl:Eu but has a higher physical density, ($D = 4.96$ g/cm$^3$ for BaFBr versus $D^{TM} 4.51$ g/cm$^3$ for BaFCl) and, therefore, BaFBr:Eu is able to absorb a larger fraction of incident x-rays per unit volume, thus allowing a further reduction in x-ray dosage.

A. L. Stevels and F. Pingault, Phillips Research Report, Vol. 30, #5, pp 277-290, 1985, describe attempts to prepare BaFBr:Eu using conventional solid state techniques employing dry mixing and firing, followed by milling of the product to the desired particle size. These attempts failed, yielding phosphors with too high an afterglow (lag) for medical applications.

U.S. Pat. No. 4,076,897 (1978) discloses the reduction of lag in BaFBr:Eu phosphors by the inclusion of potassium or rubidium ions, typically added as their halide, hydroxide, carbonate or nitrate salts.

U.S. Pat. No. 4,157,981 (1979) discloses a process for preparing BaFBr:Eu that comprises forming a suspension of BaF$_2$ in an aqueous solution of BaBr$_2$, which solution contains an equimolar amount of BaBr$_2$ in dissolved form per mole of BaF$_2$, evaporating said suspension to dryness at a temperature of 50° to 250° C., mixing the resultant BaFBr with an appropriate amount of EuBr$_3$, heating the resultant dried mixture in a weakly reducing atmosphere of nitrogen and a small amount of hydrogen for effectively reducing trivalent europium to bivalent europium, at a temperature of 600° C. to 1000° C., and then, after cooling, heating the resulting BaFBr:Eu, in an inert atmosphere, at a temperature of 600° C. to 850° C. BaFBr:Eu prepared by this method is deficient with respect to lag compared to both calcium tungstate and BaFCl:Eu.

U.S. Pat. No. 4,532,071 (1985) discloses a process for preparing BaFBr:Eu phosphors doped with various metal oxides, e.g., SiO$_2$, Al$_2$O$_3$, MgO, CaO, etc., said phosphors said to be usable in either x-ray intensifying screens or in radiation image storage panels. It is stated that lag is reduced in x-ray intensification applications, but no data are given. The purpose of the oxide is to reduce or prevent sintering of the phosphor during the second of two firing steps. It is also stated that various phosphors, including BaFBr, are not prepared by spray drying a suspension of BaF$_2$ and, for example, BaBr$_2$.

U.S. Pat. No. 4,524,016 (1985) discloses a process for the preparation of spheroidal particulate BaFCl:Eu phosphor having a narrow size distribution which process comprises: (a) spray drying a slurry comprised of BaFCl, or the precursors thereof, a europium halide, and a BaCl$_2$ flux in a liquid under conditions which produce porous spheroidal agglomerates of BaFCl, or the precursors thereof, BaCl$_2$, and the europium halide, the agglomerates having an average diameter larger than the desired diameter of the particulate phosphor; (b) firing the porous spheroidal agglomerates of step (a) in a flowing inert atmosphere for about 10 to about 120 minutes at a temperature of about 650° C. to about 950° C.; (c) cooling the fired material of step (b) to ambient temperature in an inert atmosphere; (d) washing the cooled material of step (c) with water to remove BaCl$_2$; and (e) drying the washed material of step (d) to remove the water and to produce a free flowing powder consisting essentially of spheroidal particulate BaFCl:Eu phosphor.

Solid state preparation techniques for BaFBr:Eu phosphors that employ milling or grinding of the product near or at the final stage result in the production of undesirable subsize fine particles and also result in damage to the surface of phosphor particles which is believed to contribute to afterglow (lag) by generating surface traps. In addition to increased afterglow, a consequence of this less than optimum particle morphology on the performance of the phosphor is a lower than optimum light output due to light scattering by generated fines.

The purpose of this invention is to prepare high speed BaFBr:Eu phosphor having very low afterglow, this latter being aided by the avoidance of the grinding or milling of the phosphor. A further goal is to prepare said high speed phosphor while avoiding costly and potentially hazardous firing steps that involve the use of hydrogen.

Phosphor preparation techniques that do not employ milling or grinding generally call for the use of water soluble fluxes which are washed out with water after the firing step. Examples of this are the use of BaCl$_2$ flux for BaFCl phosphor (U.S. Pat. No. 4,524,016) and Li$_2$SO$_4$ flux for the preparation of LnTaO$_4$ phosphors (U.S. Pat. No. 4,225,653). These techniques are not applicable to the preparation of BaFBr because BaFBr is unstable in the presence of pure water where it decomposes via hydrolysis.

It has been found that, in spite of the tendency for BaFBr to decompose in the presence of water, this material, as well as its europium doped analog, can be formed in and precipitated from aqueous media using the present invention. Non-aqueous media can also be employed.

By employment in this process, it is possible to prepare BaFBr:Eu phosphor without any harmful grinding and milling operations. As a consequence of this, the resulting phosphor has a higher light output and a lower lag than reported for BaFBr:Eu prepared by any other method.

SUMMARY OF THE INVENTION

The present invention provides a process for the preparation of BaFBr:Eu phosphor containing particles of a preselected diameter which process comprises:

(a) preparing a slurry containing BaF$_2$, BaBr$_2$ and a europium halide, wherein the amount of BaBr$_2$ present is at least equal to that required stoichiometrically to form BaFBr;

(b) agitating said slurry for a time sufficient to permit substantially all of said $BaF_2$ to react with said $BaBr_2$ to form BaFBr;

(c) spray drying the resulting slurry of step (b) under conditions that produce porous spheroidal agglomerates having an average diameter larger than that of the preselected diameter;

(d) firing said spheroidal agglomerates in an inert atmosphere for from about 10 to about 120 minutes at a temperature of from about 650° C. to about 800° C.;

(e) cooling the fired material of step (d) to ambient temperature in an inert atmosphere;

(f) washing the cooled material of step (e) with a solvent capable of selectively dissolving any excess $BaBr_2$; and (g) drying the washed material of step (f) to produce a free flowing powder of the BaFBr:Eu phosphor.

The present invention also provides the phosphors as made by the above described process.

DETAILED DESCRIPTION OF THE INVENTION

The first step of the process consists of forming in a liquid phase a slurry consisting of BaFBr, $BaBr_2$ and europium halides, such a $EuF_2$, $EuF_3$, $EuCl_3$, $EuBr_3$, or mixtures thereof. The resulting slurry is then spray-dried under conditions that produce porous spherical agglomerates having an average diameter larger than that of the desired phosphor particle.

Organic liquids or water or mixtures thereof can be used as the liquid phase. For example, a slurry of $BaF_2$, $BaBr_2$, and a europium halide such as $EuF_2$ can be formed in an organic liquid such as methanol. When an organic liquid is used, it is necessary to treat the spray dried material to insure removal of substantially all organic material before firing in an inert atmosphere. Phosphors made with the use of organic liquids are therefore first fired in air at about 250° C. to about 375° C. for about 0.5 to 1.5 hours before firing in the inert atmosphere.

The preferred method of forming the slurry is to precipitate BaFBr in a vigorously stirred aqueous $BaBr_2$ solution containing europium halide. This is accomplished by a digestion-precipitation process involving $BaF_2$ and an aqueous $BaBr_2$ solution according to the following equation:

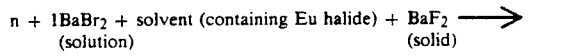
n + 1BaBr$_2$ + solvent (containing Eu halide) + BaF$_2$ ⟶
(solution)                                                (solid)

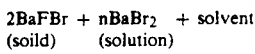
2BaFBr + nBaBr$_2$ + solvent
(soild)      (solution)

The amount of $BaBr_2$ employed is from about 1.0 to about 5 times that required by stoichiometry. That is, n in the above equation is from about 0 to about 4. $BaF_2$ powder is slowly added to the aqueous $BaBr_2$ solution which contains the europium halide over a period of about 5 to 15 minutes. The amount of $BaBr_2$ must be at least about equivalent to the stoichiometric amount, as indicated earlier.

Use of at least equivalent amounts of $BaBr_2$ is important for two reasons. When less than an equivalent amount of $BaBr_2$ is used, the BaFBr product may contain some unconverted $BaF_2$. Excess $BaF_2$ in the formulation is detrimental to final phosphor properties in that the phosphor exhibits lower prompt emission and higher delayed emission (lag). The detrimental effects of $BaF_2$ are evident regardless of what process is employed to make BaFBr:Eu.

In order to ensure the presence of a satisfactory amount of flux in the subsequent firing step, it is desirable to use an amount of $BaBr_2$ that is at least about 40% in excess of that required by stoichiometry. It is preferred to use an amount of $BaBr_2$ such that the aqueous solution is at all times at least 50% saturated with $BaBr_2$.

Excess $BaBr_2$ is desirable to serve as a flux. The particular flux and the quantity of the flux is critical. For example, it is believed that the spray drying, while effecting water removal, causes the BaFBr and europium halide to be coated and cemented together with solid $BaBr_2$ to form porous spheroidal agglomerates. In addition, during the firing, the $BaBr_2$ flux enhances the sintering of the particles in the agglomerate and the diffusion of the europium, and any other ingredients, into the BaFBr lattice. Finally, the flux must be immiscible in BaFBr:Eu at room temperature, and it must be rejected to the surface of the BaFBr:Eu phosphor particle where it can be removed by dissolving without affecting the BaFBr:Eu. $BaBr_2$ is the flux material which best satisfies all of the above requirements. Up to about a five fold excess of $BaBr_2$ over that required by stoichiometry has been used successfully, but it is not believed that this is the upper limit, although no benefit is expected from exceeding this value.

After the $BaF_2$ is added, vigorous stirring is maintained for about 4 to about 24 hours, depending on the sample size. The time is not critical, but is generally that required to effect the substantially complete reaction of $BaF_2$ and $BaBr_2$ to form BaFBr. When the BaFBr precipitation step is completed, a small portion of the slurry can be removed, filtered, washed with a solvent selected for its ability to remove excess $BaBr_2$ (see below) and dried prior to subjecting it to x-ray analysis to confirm that the reaction is substantially completed, e.g. by determining that there is no remaining evidence of $BaF_2$ x-ray diffraction lines.

The preferred europium sources are in form of water soluble $EuCl_3$ or $EuBr_3$. While these europium sources are more oxidation susceptible than the corresponding fluorides, they tend to ensure a more uniform distribution of the europium throughout the BaFBr matrix. The amount of europium halide used depends on the amount of Eu-doping desired in the phosphor. Generally, the art discloses that $Ba_{1-y}Eu_yFBr$, wherein y is from about 0.001 to about 0.2 is preferred for use as phosphor in x-ray intensifying screens.

The slurry comprised of BaFBr and europium halide in a $BaBr_2$-containing solution, and any other optional ingredients, is spray dried using conditions which produce spray dried particles with diameters larger than the desired diameter of the BaFBr phosphor particles. The porous spheroidal agglomerates which are produced consist of BaFBr, $BaBr_2$, and europium halide. The specific operating conditions to produce spray dried agglomerates of a certain size will depend in part on the particular spray drying apparatus, but appropriate variations of spray drying conditions to gain desired results are well known to those familiar with spray drying. Of interest is that spray drying in accordance with the instant invention does lead to successful phosphors, despite the teaching of U.S. Pat. No. 4,532,071.

The porous spheroidal agglomerates obtained by spray drying must be fired at such a temperature and for such a time so as to produce the desired particulate product. The size of the phosphor particles is determined by the agglomerate size and the firing conditions. If the temperature is too low, or the firing time too short, consolidation of the original particles will not occur and europium diffusion will be insufficient. Excessive firing temperatures or times cause excessive grain growth of large BaFBr platelets. The firing temperature should be in the range of about 650° C. to about 800° C., and the firing time should be in the range of about 10 to about 120 minutes to obtain the desired product. Preferably, the firing temperature is from about 700° C. to about 800° C., and the firing time is from about 10 to 50 minutes. The firing must be carried out, and the resulting product must be cooled in a flowing atmosphere comprised of an inert gas such as argon or nitrogen. Although any type of furnace which is capable of producing the desired heating conditions with the required atmosphere can be used to carry out the firing, a belt furnace is preferred. The use of a belt furnace permits the firing of a large number of samples in a continuous manner. Sample containers made of nonreactive materials such as fused silica or recrystallized alumina can be used.

The fired material is washed with a selective solvent to remove excess $BaBr_2$ and any other soluble material which may be present. The term "selective solvent" as used herein denotes a solvent capable of dissolving the $BaBr_2$ without affecting the BaFBr:Eu. Suitable solvents include, but are not limited to methanol and a 90:10 by volume mixture of water and citric acid. This can be accomplished by soaking or stirring the sintered material in amounts of selective solvent which are in excess of that necessary to dissolve the soluble material present. The $BaBr_2$ and solvent may be reclaimed and used in subsequent phosphor preparations. If an aqueous citric acid wash is employed, the washed phosphor may be further washed with an organic solvent, e.g. isopropanol or acetone, in order to facilitate drying. After removal of the flux by dissolving, the remaining insoluble material is dried and the free-flowing powder product consisting of particles of europium-doped barium fluoride is obtained. The particles have a narrow size distribution.

One measure of performance of an x-ray intensifying screen is its speed (analogous to photographic speed), that is, the optical density achieved after x-ray exposure of a film in contact with the screen. This has been determined by measuring the density of blackening of the x-ray film after exposure of such film in contact with the screen according to the procedure described below.

A. Sample Preparation

The phosphor is sieved through a 200 mesh sieve, and the following components are measured into a 15 cc vial containing eight 4 mm glass beads:
4.32 g phosphor
1.00 ml butyl acetate
2.54 g polyvinyl butyral binder (see U.S. Pat. No. 3,043,710).

The mixture is shaken on a Spex ® oscillatory-type shaker for 15 minutes, then immediately coated on a pigment board using a Goodner mechanical coater and a 10 mil drawdown knife. The resultant coating is air dried for a least 15 minutes to give a dry coating 5±1 mil (130µ±25µ) in thickness. A inch ×1½ inch sample is cut from the coated board and mounted on a pigment board with other samples and standards for exposure tests.

B. Sample Testing

The pigment board with the screen sample attached is inserted into an 8 inch ×10 inch (20.3 cm×25.4 cm) cassette containing a sheet of high speed medical x-ray film. A prompt emission exposure of 0.6 m.a.s. (0.24 sec, 25 m.a. 80 KvP) is made at either 25 inches or 50 inches from a tungsten source filtered by 0.25 inch aluminum. The film is then removed and processed in an automatic rapid processor which is operated at 33° C. and containing the standard p-N-methylamino hydrosulfate/hydroquinone developer, with a total developing time of 90 seconds (develop, fix, wash, and dry). The optical density of the exposed and developed film is determined using a Macbeth ® digital densitometer and recorded as "speed" and quoted relative to the density of an identical exposure made using a Du Pont Cronex ® HI Plus screen and Cronex ®-4 film.

Lag is determined by exposing the samples to 400 m.a.s. (200 m.a. 25 sec 80 KvP) x-rays from the same tungsten source, without the aluminum filter, then after 15 seconds contacting the screen sample with a fresh piece of film for 5 minutes. The film is then developed and the optical density is measured as above for the speed determination. The optical density so recorded is the "lag".

The background is then determined by exposing a piece of the same x-ray film employed to determine lag to the lag exposure in the absence of any test screen. The difference between the background and lag is recorded as the net lag.

In the illustrative examples that follow, all temperatures are in degrees Celsius. All fired samples prepared in the examples were fired in fused silica boats in a belt furnace (B.T.U. Inc. model TLH-22-32-4N12Y, North Billerica, MA) having three heating zones with an effective heating length of 24 inches (60 cm). The nitrogen flow through the furnace during the firing was maintained at between 20 liter/minute and 25 liter/minute.

To minimize possible contamination with $SiO_2$, all of the apparatus used to prepare and mix the BaFBr slurries was made of, or coated with, Teflon ® fluoropolymer.

In the examples that employ $EuF_2$ as the europium source, an $EuF_2$ suspension, prepared as follows, was used:

$EuF_2$, 40.0 g, was milled in approximately 1000 ml of distilled water for about 16 hours. The suspension was transferred from the mill; the mill was rinsed with distilled water; and the final volume of the suspension plus rinses was adjusted to 1100 ml with distilled water. Assuming a uniform suspension, the $EuF_2$ concentration was 0.0363 g/ml. A sample of this suspension was evaporated to dryness at 110° C. in air and the residue analyzed by x-ray to confirm that no decomposition had occurred during the milling operation. Prior to each use, the suspension was agitated. For each use a measured amount was removed from the bulk and slowly added to the mixture of $BaF_2$ powder and aqueous $BaBr_2$ solution at the beginning of the stirring process so that the intimate mixing of $EuF_2$ and the slowly forming BaFBr precipitate would be facilitated.

EXAMPLE 1

Preparation of $Ba_{0.99}Eu_{0.01}FBr$ in methanol

A solution of barium bromide dihydrate (100 g, 0.300 mole) in 400 ml of methanol was prepared in a Teflon ® fluoropolymer beaker at room temperature. Barium fluoride (37.10 g, 0.2116 mole) and europium (II) fluoride (0.40 g, 0.0021 mole) ) The slurry was agitated for three hours and then spray dried. A portion of this material was placed in a tube furnace at room temperature and rapidly heated to 300° C. in an air atmosphere and held for 15 minutes. The sample was removed from the oven and cooled to room temperature. The sample was fired in a belt furnace at 725° to 730° C. for 24 minutes with a 20 liter per minute nitrogen flow. The cooled material was washed with methanol in an ultrasonic bath for 15 minutes. X-ray analysis of the resulting powder showed the predominant component to be BaFBr:Eu. The spectrum contained a single spectral line possibly due to $BAF_2$.

EXAMPLE 2

Preparation of $Ba_{0.95}Eu_{0.05}FBr$ in Water; Firing at Various Temperatures A slurry of barium bromide dihydrate (93.0 g, 0.279 mole) in 50 ml of water was prepared. Barium fluoride (9.27 g, 0.0529 mole) and europium (II) fluoride (0.10 g, 0.00053 mole) were added, and the slurry was agitated 20 hours at room temperature. During this agitation period, the slurry increased in apparent viscosity. The slurry was then spray dried using a Buchi #140 Mini Spray Drier operated with nitrogen as the atomizing gas. The inlet temperature was 165° C., outlet temperature was 80° C., pump setting was 3-4 out of 10 maximum, and the aspiration setting was 4. A small portion of the spray dried material was treated with methanol to dissolve out the excess barium bromide, and the residue was examined by x-ray analysis and scanning electron microscopy (SEM). X-ray analysis indicated pure BaFBr; all diffraction lines were indexed on the basis of American Society for Testing and Materials reference diffraction card NO. 2490. The SEM photo showed the primary particles to be cube-like with edge lengths of ~0.2 to 0.6 μm.

The remainder of this sample was divided into a number of portions and fired at different temperatures to determine the effect of firing temperature on the particle size of the resulting phosphor. All samples were fired in fused silica boats using a 3 zone BTU belt furnace employing flowing nitrogen, 20 L/minute, and a belt speed of 1 inch per minute. Results are in Table 1.

In order to test the performance of this material as an x-ray phosphor, a small test screen (see U.S. Pat. No. 4,225,653 for procedure) was prepared using phosphor sample 4 from Table 1. The results obtained using 30 kVp x-ray irradiation showed the test screen to have a speed 2.5 times that of a Du Pont Cronex ® HiPlus calcium tungstate intensifying screen. This represents an increase in speed of 12% versus conventionally prepared BaFBr:Eu Phosphor.

TABLE 1

| Sample Number | Firing Temperature | Sample Appearance. Visual | SEM Observation |
|---|---|---|---|
| 1 | Zone 1: 610° C. Zone 2: 610° C. Zone 3: 610° C. | White | Dog bone shaped particles, ~1 μm average |
| 2 | Zone 1: 700° C. Zone 2: 700° C. Zone 3: 700° C. | White | Flat plates, edges rounded, 2-4 μm |
| 3 | Zone 1: 740° C. Zone 2: 725° C. Zone 3: 740° C. | White, lightly sintered | Narrow particle size distribution, 4-8 μm particles, rounded edges, aspect ratio 1:4:7 |
| 4 | Zone 1: 750° C. Zone 2: 750° C. Zone 3: 750° C. | White, lightly sintered | Well formed thick plate with rounded edges, 3-8 μm |
| 5 | Zone 1: 800° C. Zone 2: 800° C. Zone 3: 800° C. | Sample appeared partly melted | 40 × 20 × 1 μm irregular plates |

EXAMPLES 3-6

Preparation of BaFBr:Eu Phosphors Using $EuF_2$ and $EuF_3$

Using methods similar to that described in Example 2, the following phosphors (Table 2) were prepared. Firing temperature was 770° C. In all cases, the phosphors, after the methanol extraction of excess barium dibromide, were free flowing powders, requiring no milling or grinding prior to sample screen preparation

TABLE 2

| Example | Phosphor | $BaBr_2$-$2$-$H_2O$ grams (moles) | $H_2O$ grams (moles) | $BaF_2$ grams (moles) | $EuF_2$ grams (moles) | $EuF_3$ grams (moles) |
|---|---|---|---|---|---|---|
| 3 | $Ba_{0.90}Eu_{0.10}FBr$ | 150.0 0.450 | 300 — | 17.67 0.1008 | 5.003 0.02634 | 0 — |
| 4 | $Ba_{0.99}Eu_{0.01}FBr$ | 150.0 0.450 | 300 300 | 20.262 0.1156 | 0.447 0.00235 | 0 — |
| 5 | $Ba_{0.99}Eu_{0.01}FBr$ | 78.39 0.235 | 100 — | 20.22 0.115 | 0 — | 0.49 0.00234 |
| 6 | $Ba_{0.95}Eu_{0.05}FBr$ | 78.39 0.235 | 100 — | 18.56 0.106 | 0 — | 2.45 0.0117 |

The phosphors were used to prepare test screens which were then tested for speed and lag (Table 3).

TABLE 3

| Example | Speed vs. HI Plus | Lag |
|---|---|---|
| 3 | 2.15 | 0.64 |
| 4 | 1.50 | 0.60 |
| 5 | 2.95 | 1.29 |
| 6 | 3.58 | 0.51 |

EXAMPLE 7

Preparation of $Ba_{0.99}F:Eu_{0.01}FBr$ using Europium (III) chloride

Barium bromide dihydrate (666.38 g, 2.000 mole) was dissolved in 600 ml of distilled water and the resulting solution was filtered through a sintered glass filter to remove any insoluble impurities. Europium (III) chloride (5.138 g, 0.199 mole) dissolved in 70 ml of water was then added. Barium fluoride (164.4 g, 0.9376 mole) was then added slowly with stirring, and the resulting suspension was stirred overnight. The slurry was then spray dried in a Niro ® (Niro Atomizer, Columbia, MD 21045) spray drier with a 31.5 inch diameter spray chamber and a rotary atomizer (Model number M-

02/B). Spray drying conditions included an inlet temperature of 225° C. and an outlet temperature of 130° C. The resulting agglomerated powder was then fired in fused silica boats in a BTU belt furnace with a nitrogen flow of 25 liters per minute. The belt speed was 0.25 inch per minute through a total hot zone length of 24 inches set throughout at 770° C. After firing, the product was slurried in methanol to dissolve out the barium bromide flux. Solid product was collected on a sintered glass filter funnel. After air drying, the product was a free flowing powder that did not require grinding or milling prior to screen preparation. Test screens (8 × 10 inch) were prepared using two different coating weights. The results are summarized in Tables 4 and 5.

TABLE 4

| Screen | Film | Speed at 30 KvP (Mo) | Speed at 70 KvP (W) |
|---|---|---|---|
| Du Pont Cronex ® Hi Plus | Cronex ®-4 | — | 1.00 |
| BaFBr at 206 mg/in$^2$ coating weight | Cronex ®-7 | 2.82 | 1.68 |
| BaFBr at 265 mg/in$^2$ coating weight | Cronex ®-7 | 2.88 | 1.99 |

TABLE 5

| Screen | Lag | Noise |
|---|---|---|
| Du Pont Cronex ® Hi Plus | — | 16.8 |
| BaFBr at 206 mg/in$^2$ coating weight | 0.28 | 22.8 |
| BaFBr at 265 mg/in$^2$ coating weight | 0.28 | 21.3 |

EXAMPLES 8-12

Preparation of Ba$_{0.99}$Eu$_{0.01}$FBr with Varying Amounts of BaB$_2$ using EuBr$_3$ and EuCl$_3$ In all examples in the table below the phosphors were washed free of excess/unreacted BaBr$_2$ with methanol except in Example 12, wherein the phosphor was washed with 10% (V/V) citric acid/water. X-ray analysis on this sample confirmed that all unreacted BaBr$_2$ had been removed. SEM analysis of this powder showed that the bulk of the particles consisted of flat, elongated particles approximately 8 to 12 μm in length.

| Example | BaBr$_2$·2H$_2$O grams (moles) | H$_2$O grams | BaF$_2$ grams (moles) | EuBr$_2$ grams (moles) | EuCl$_3$ grams (moles) | Molar ratio BaBr$_2$ to (BaF$_2$ + EuX$_3$) |
|---|---|---|---|---|---|---|
| 8 | 999.4 (3.000) | 1000 | 246.6 (1.406) | 10.96 (0.028) | — | 2.092 |
| 9 | 249.8 (0.750) | 300 | 85.91 (0.490) | 3.91 (0.00998) | — | 1.500 |
| 10 | 307.54 (0.923) | 300 | 83.15 (0.474) | 3.70 (0.00945) | — | 1.909 |
| 11 | 666 (2.00) | 600 | 164.0 (0.935) | — | 5.138 (0.0199) | 2.094 |
| 12 | 166.57 (0.500) | 300 | 85.91 (0.490) | 3.91 (0.00998) | — | 1.00 |

The phosphors were used to prepare test screens which were then tested for speed and lag.

| Example | Ratio of Speed to that of Hi Plus | Lag |
|---|---|---|
| 8 | 3.14 | 0.34 |
| 9 | 3.73 | 0.89 |
| 10 | 3.21 | 0.33 |
| 11 | 3.00 | 0.92 |
| 12 | — | — |

EXAMPLE 13

Preparation of BaFBr Employing Aqueous Citric Acid Wash

A sample of spray dried BaFBr was prepared in a manner similar to that given above, in Example 7, except the Europium salt was omitted. The BaFBr-BaBr$_2$ mixture was fired at 770° C. under nitrogen in the belt furnace. The fired sample was divided into two parts and excess BaBr$_2$ was washed out using methanol in one case, and a 10% (V/V) citric acid/water solution in the other. The aqueous citric acid washed material was further washed with isopropanol to facilitate drying. The samples were then dried and subjected to x-ray analysis. X-ray diffraction showed the two portions to be essentially identical and to be essentially pure BaFBr.

Although the invention has been illustrated by the foregoing examples, it is to be understood that the examples are illustrative only, and that the invention includes all modifications permitted by the following claims.

I claim:

1. A process for the preparation of Ba$_{1-y}$Eu$_y$FB$_r$ where y is a number from 0.001 to 0.2 in the form of particles of a preselected diameter which process comprises:
   (a) preparing a slurry containing BaF$_2$, BaBr$_2$ and a europium halide, wherein the amount of BaF$_2$ present is at least 1.4 times that required stoichiometrically to form the phosphor;
   (b) agitating said slurry for a time sufficient to permit substantially all of said BaF$_2$ to react with said BaBr$_2$ to form BaFBr;
   (c) spray drying the resulting slurry of step (b) under conditions that produce porous spheroidal agglomerates having an average diameter larger than that of the preselected diameter;
   (d) firing said spheroidal agglomerates in an inert atmosphere for from about 10 to about 120 minutes at a temperature of from about 650° C. to about 800° C.;
   (e) cooling the fired material of step (d) to ambient temperature in an inert atmosphere;

(f) washing the cooled material of step (e) with methanol or a 90:10 by volume mixture of water and citric acid to selectively remove excess $BaBr_2$; and (g) drying the washed material of step (f) to produce a free flowing powder of the [BaFBr:Eu].

2. The process of claim 1 wherein the europium halide is selected from the group consisting of $EuF_2$, $EuF_3$, $EuCl_3$, $EuBr_3$ and mixtures thereof.

3. The process of claim 2 wherein the $BaBr_2$ and $BaF_2$ used in step (a) are in a molar ratio of from about 1.4:1 to about 5:1.

4. The process of claim 2 wherein the $BaBr_2$ used in step (a) is sufficient to keep the slurry at least about 50% saturated with $BaBr_2$.

5. The process of claim 4 wherein the temperature of step (d) is from about 700° C. to about 800° C.

6. The process of claim 5 wherein the time of step (d) is from about 10 to about 50 minutes.

7. The process of claim 6 wherein the inert atmosphere is argon or nitrogen.

* * * * *

UNITED STATES PATENT AND TRADEMARK OFFICE
CERTIFICATE OF CORRECTION

PATENT NO. : 5,279,765
DATED : JANUARY 18, 1994
INVENTOR(S) : AUGUST FERRETTI

It is certified that error appears in the above-identified patent and that said Letters Patent is hereby corrected as shown below:

Cover sheet, 1st column, section [54], delete "PROCESS FOR PREPARING BAFBR:EU PHOSPHORS" and insert in its place -- PROCESS FOR PREPARING BaFBr:Eu PHOSPHORS"

Col. 1, line 2, delete "BAFBR:EU" and insert in its place -- BaFBr:Eu --.

Col. 1, line 6, delete "Jul. 20, 1980" and insert in its place -- Jul. 20, 1989 --.

Col. 1, line 27, delete "D tm 4.51 g/cm$^3$" and insert in its place -- D = 4.51 g/cm$^3$ --.

Col. 1, line 53-54, delete "BaFB-r:Eu" and insert in its place -- BaFBr:Eu --.

Col. 9, line 41, delete "BaB$_2$" and insert in its place -- BaBr$_2$ --.

UNITED STATES PATENT AND TRADEMARK OFFICE
CERTIFICATE OF CORRECTION

PATENT NO. : 5,279,765
DATED : JANUARY 18, 1994
INVENTOR(S) : AUGUST FERRETTI

It is certified that error appears in the above-identified patent and that said Letters Patent is hereby corrected as shown below:

Col. 9, in the Table, 5th column, delete the heading "$EuBr_2$ grams (moles)" and insert in its place -- $EuBr_3$ grams (moles) --.

Col. 10, line 32, delete "$Ba_{1-y}Eu_yFB_r$" and insert in its place -- $Ba_{1-y}Eu_yBr$ --.

Col. 10, line 37, delete "curopium" and insert in its place -- europium --; line 37, delete "$BaF_2$" and insert in its place -- $BaBr_2$ --.

Signed and Sealed this

Twenty-sixth Day of July, 1994

Attest:

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,279,765
DATED : Jan. 18, 1994
INVENTOR(S) : August Ferretti

It is certified that error appears in the above-indentified patent and that said Letters Patent is hereby corrected as shown below:

Col. 10, line 33, insert, following "0.2", the expression -- having a high speed and an afterglow (lag) value of 1.29 or less --.

Col. 11, line 7, delete "[BaFBr:Eu]", and insert in its place -- phosphor --.

Col. 10, line 33, before " where " insert -- phosphor --.

Signed and Sealed this

First Day of November, 1994

Attest:

BRUCE LEHMAN

Attesting Officer

Commissioner of Patents and Trademarks